(12) United States Patent
Spooren et al.

(10) Patent No.: US 10,192,184 B2
(45) Date of Patent: Jan. 29, 2019

(54) ENERGY STORAGE

(71) Applicants: SONY CORPORATION, Minato-ku (JP); SONY EUROPE LIMITED, Surrey (GB)

(72) Inventors: Jan Spooren, Schoten (BE); Christopher Rutherford, West Yorkshire (GB)

(73) Assignees: SONY CORPORATION, Tokyo (JP); SONY EUROPE LIMITED, Weybridge, Surrey (GB)

( * ) Notice: Subject to any disclaimer, the term of this patent is extended or adjusted under 35 U.S.C. 154(b) by 700 days.

(21) Appl. No.: 14/389,546

(22) PCT Filed: Mar. 19, 2013

(86) PCT No.: PCT/GB2013/050703
§ 371 (c)(1),
(2) Date: Sep. 30, 2014

(87) PCT Pub. No.: WO2013/144577
PCT Pub. Date: Oct. 3, 2013

(65) Prior Publication Data
US 2015/0112751 A1   Apr. 23, 2015

(51) Int. Cl.
*G06Q 10/06* (2012.01)
*G06Q 50/06* (2012.01)
(Continued)

(52) U.S. Cl.
CPC ....... *G06Q 10/06315* (2013.01); *G06Q 50/06* (2013.01); *H02J 3/14* (2013.01);
(Continued)

(58) Field of Classification Search
CPC ......... G06F 10/06; G06F 50/06; G06Q 10/06; G06Q 50/06
(Continued)

(56) References Cited

U.S. PATENT DOCUMENTS 6,900,556 B2   5/2005   Provanzana et al.
7,844,370 B2   11/2010  Pollack et al.
(Continued)

FOREIGN PATENT DOCUMENTS

CN   102180169 A   9/2011
CN   102184475 A   9/2011
(Continued)

OTHER PUBLICATIONS

International Search Report and Written Opinion dated May 28, 2014 in PCT/GB2013/050703 filed Mar. 19, 2013.
(Continued)

*Primary Examiner* — Nga B Nguyen
(74) *Attorney, Agent, or Firm* — XSENSUS LLP

(57) ABSTRACT

A method of controlling storage of electrical energy by charging and discharging an energy storage device in response to pricing data indicative of future prices of electrical energy over time and energy losses caused by charging and discharging the energy storage device comprises detecting alternating candidate charging and discharging occasions with respect to the pricing data by selecting a next occurrence of a locally minimum price in the pricing data as a candidate charging occasion or a next occurrence of a locally maximum price in the pricing data as a candidate discharging occasion; validating a candidate charging or discharging occasion if the price difference between that candidate charging or discharging occasion and another later price in the pricing data is at least sufficient to compensate for the energy losses caused by charging and discharging the energy storage device; and charging and discharging the energy storage device at the validated charging and discharging occasions, respectively.

18 Claims, 13 Drawing Sheets

(51) Int. Cl.
*H02J 3/14* (2006.01)
*H02J 3/32* (2006.01)
*H02J 7/00* (2006.01)

(52) U.S. Cl.
CPC ............... *H02J 3/32* (2013.01); *H02J 7/007* (2013.01); *H02J 2003/146* (2013.01); *Y02B 70/3225* (2013.01); *Y04S 20/222* (2013.01); *Y04S 20/224* (2013.01)

(58) Field of Classification Search
USPC ........................................................ 705/7.25
See application file for complete search history.

(56) References Cited

U.S. PATENT DOCUMENTS

| | | |
|---|---|---|
| 2003/0094927 A1 | 5/2003 | Pavlovic et al. |
| 2005/0174094 A1 | 8/2005 | Purdy et al. |
| 2008/0097664 A1* | 4/2008 | Aoyama ............... H02J 7/1423 701/36 |
| 2010/0017249 A1* | 1/2010 | Fincham ............... B60L 3/12 705/412 |
| 2010/0179714 A1* | 7/2010 | Tani ...................... B60W 20/12 701/22 |
| 2010/0276998 A1 | 11/2010 | Luo et al. |
| 2011/0050239 A1* | 3/2011 | Hoshino ............ G01R 31/3679 324/435 |
| 2011/0078092 A1* | 3/2011 | Kim .................... B60L 11/1824 705/412 |
| 2011/0125337 A1* | 5/2011 | Zavadsky ............ G06F 1/263 700/291 |
| 2011/0137481 A1 | 6/2011 | Manz et al. |
| 2011/0178959 A1* | 7/2011 | Nakajima ........... B60L 11/1824 705/412 |
| 2011/0193428 A1* | 8/2011 | Lemieux ............... H02K 35/02 310/25 |
| 2011/0199052 A1 | 8/2011 | Sun et al. |
| 2011/0313603 A1 | 12/2011 | Laberteaux et al. |
| 2012/0005126 A1* | 1/2012 | Oh ......................... G06Q 50/06 705/412 |
| 2012/0112698 A1* | 5/2012 | Yoshimura ............. G06Q 30/04 320/109 |
| 2012/0150709 A1* | 6/2012 | Kaji ....................... G06Q 40/00 705/35 |
| 2012/0229081 A1 | 9/2012 | Kiuchi et al. |
| 2012/0249056 A1* | 10/2012 | Ukita ..................... H02J 3/008 320/107 |
| 2012/0249065 A1* | 10/2012 | Bissonette ............ B60L 11/184 320/109 |
| 2013/0015708 A1 | 1/2013 | Ukita et al. |
| 2013/0335032 A1* | 12/2013 | Kuribayashi ....... B60L 11/1844 320/137 |
| 2014/0297567 A1* | 10/2014 | Oe ......................... G06Q 50/06 705/412 |

FOREIGN PATENT DOCUMENTS

| | | |
|---|---|---|
| EP | 2 339 686 A1 | 6/2011 |
| EP | 2 506 380 A1 | 10/2012 |
| EP | 2 509 180 A1 | 10/2012 |
| EP | 2 546 945 A2 | 1/2013 |
| WO | 2012/046832 A1 | 4/2012 |
| WO | 2012/133024 A1 | 10/2012 |

OTHER PUBLICATIONS

Yixing Xu, et al., "Optimal Scheduling and Operation of Load Aggregator with Electric Energy Storage in Power Markets" IEEE, North American Power Symposium (NAPS), Sep. 26-28, 2010, pp. 1-7.
Jan Spooren, "'Caterpillar' Algorithm", Sony Corporation, techsoft centre, Version 2, Mar. 2012, pp. 1-12.
Combined Chinese Office Action and Search Report dated Feb. 6, 2016 in Patent Application No. 201380028488.2 (with English translation of categories of cited documents).

* cited by examiner

ENERGY STORAGE

CROSS REFERENCE TO RELATED APPLICATION

The present application claims the benefit of the earlier filing date of EP12162695.6 filed in the European Patent Office on 30 Mar. 2012, the entire content of which application is incorporated herein by reference.

BACKGROUND

Field

This disclosure relates to energy storage.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

With decreasing battery prices, increasing battery capacity and the rise of renewable energy sources which introduce unpredictability to the energy production, battery storage for the electricity grid becomes an increasingly interesting alternative for grid balancing. The term "grid balancing" is used here to relate to the ongoing need to endeavour to match the consumption requirements of an electricity grid to the production capacity or supply capabilities associated with that electricity grid, and "grid" is used as a generic term for the electricity supply network.

Typically, the usage pattern for an electricity grid varies dramatically over the course of a 24 hour period. Overnight, usage is generally lower than during the normal working day. Within the day time period, there can be significant peaks and troughs in the consumption pattern relating to the timing of industrial activities and workers' break periods, and to the typical timing of non-working activities such as cooking an evening meal.

One effect of this variation in the consumption pattern is on the price associated with electricity supply at any particular time. The price varies in a generally inverse relation to the expected demand, so that electricity is expensive at times of high demand (or, rather, at anticipated times of high demand) and is cheaper at anticipated times of lower demand.

This pricing variation has various effects on the operation of the grid. Firstly, it provides an incentive for bulk users to draw power at times of lower demand. So, if a factory can operate overnight, its electricity costs may be considerably lower than applying to an equivalent operation during the day. Secondly, it provides an incentive for power generating companies to provide additional generating capacity at the times of higher demand.

The pricing structure is generally set in advance by an interaction between electricity providers and bulk consumers such as resellers. For example, there may be a daily interaction such as an auction which sets the prices to be imposed for electricity supply at different times during the next calendar day or 24-hour period, or the next week. These prices can then be published to the market so that consumers and providers can take whatever action they think fit based on the time-dependent pricing structure as published.

A further complication in grid balancing arrangements applies to renewable energy sources. Typically, there are strong government incentives in many countries to increase or maintain the capacity to generate electricity from so-called renewable sources such as solar, wind or wave power. While these renewable sources have many advantages in terms of their possibly lower use of non-renewable carbon resources, they suffer from a disadvantage in that the amount of electricity delivered at any instant in time can depend upon aspects of the natural environment which are outside the control of the electricity supply company. For example, the sun may go behind a cloud or the wind may drop, all leading to a relatively sudden decrease in the amount of electricity produced from a solar or wind power source. So, for times of the day when reliance is made upon renewable energy, the electricity generators need to build into the pricing model the fact that an alternative supply source may be needed at very short notice.

To address both of these needs, it has been proposed that electricity may be stored from the grid and later released to the grid at times of particular need. Various technologies are available for storing electricity in this way. In one example, one or more rechargeable batteries may be used. In other examples, mechanical energy storage may be employed, for example by connecting a large flywheel to a motor/generator arrangement, or by pumping water from a lower point to a higher point so that when the water is released from the higher point it can drive a turbine to generate electricity.

SUMMARY

This disclosure provides a method of controlling storage of electrical energy by charging and discharging an energy storage device in response to pricing data indicative of future prices of electrical energy over time and energy losses caused by charging and discharging the energy storage device, the method comprising:

detecting alternating candidate charging and discharging occasions with respect to the pricing data by selecting a next occurrence of a locally minimum price in the pricing data as a candidate charging occasion or a next occurrence of a locally maximum price in the pricing data as a candidate discharging occasion;

validating a candidate charging or discharging occasion if the price difference between that candidate charging or discharging occasion and another later price in the pricing data is at least sufficient to compensate for the energy losses caused by charging and discharging the energy storage device; and charging and discharging the energy storage device at the validated charging and discharging occasions, respectively.

The disclosure recognises that battery storage operation can be triggered by pricing mechanisms, where batteries are charged when electricity is cheap (or "clean", the terms "clean" and "dirty" relating to the environmental and/or carbon cost of producing the electricity) and discharge when electricity is expensive (or 'dirty').

However creating an algorithm that will schedule the correct charging and discharging time from a predicted (or upfront auctioned) price table is not a straightforward task. Embodiments can at least alleviate this problem. As input, embodiments of the method take a price table for future electricity price (varying in time) and the battery system's round-trip efficiency. As output, embodiments of the method can provide a list of times when to charge and when to discharge the battery.

The usefulness of this technique is not limited to batteries; it can also be used for a variety of storage systems, including (for example) rotational energy storage using spinning masses. It can potentially also be used for other price-based buying systems.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, in which.

DESCRIPTION OF THE EMBODIMENTS

Figure 1:
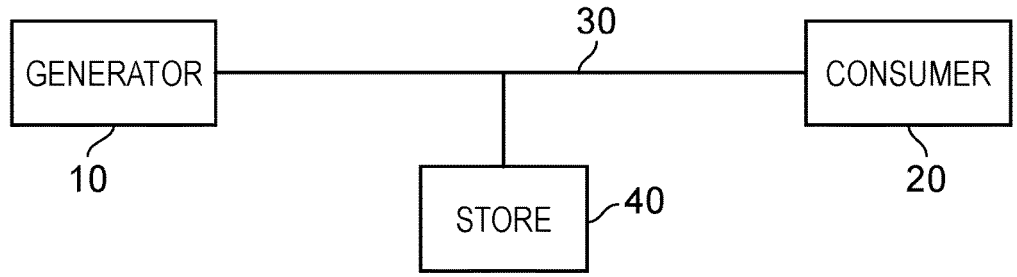
FIG. 1 schematically illustrates a part of an electricity grid including an energy store device.

By way of introduction, a battery-based system to store and release grid power will first be described. Such an arrangement typically comprises:
a) a battery charger, which converts mains voltage (such as 230 volts (V) alternating current (AC)) into a lower (for example, 48 V) direct current (DC) voltage
b) a battery
c) an inverter such as a so-called grid-tied inverter, which converts the DC voltage from the battery back into mains voltage (for example, 230 V AC voltage), or more generally, into a voltage higher than the battery voltage.

All three of these features can incur energy losses and therefore can be considered to exhibit a particular efficiency. The overall efficiency of the system is referred to as a "round-trip" efficiency to indicate that it represents a single efficiency figure linking the amount of energy input into the charge/discharge system to the amount of energy recovered from the system. The round-trip efficiency affects whether it is economically appropriate to perform a charge/discharge cycle.

The round-trip efficiency for a particular system may be known from previous evaluations of that system, for example at manufacture or post-installation testing. Alternatively, the round-trip efficiency can be measured, for example on a periodic basis such as once a day, or once in each charging/discharging cycle, by the system itself. In this case, the system can apply known techniques to measure the amount of energy provided to the system during charging and the amount of energy released from the system during discharging.

As mentioned, the round-trip efficiency Eff is the total efficiency of the charge/store/discharge system as measured at mains voltage. If for instance the system consumes 1 kWh (kilowatt-hour) of electricity for charging the battery, the real amount of energy that can be delivered back to the grid is not 1 kWh, but 1 kWh×Eff.

For example, in a system with a round-trip efficiency of 85%, this means that for a 1 kWh energy input, the energy delivered back to the grid would be:

$$1 \text{ kWh} \times 0.85 = 0.85 \text{ kWh}$$

Viewed in another way, for every 1 kWh of energy delivered back to the grid, the system had to consume 1 kW/Eff to provide the necessary charge in the battery in order to deliver that 1 kWh back to the grid.

The amount of energy lost in a charge/discharge cycle delivering 1 kWh to the grid is therefore (1 kWh/Eff)−1 kWh Let:

$P_C$=the electricity price paid for 1 kWh at the time of charging the battery $P_D$=the electricity price received for 1 kWh at the time of discharging the battery Then the cost of the lost electricity when delivering back 1 kWh to the grid is:

$$\text{Cost}=((1/\text{Eff})-1) \cdot P_C$$

From this it follows that it only makes economic sense to charge and discharge if:

$$P_D - P_C > ((1/\text{Eff})-1) \cdot P_C$$

Or simply:

$$P_D > P_C / \text{Eff}$$

Techniques for selecting charging and discharging times according to the efficiency of the charge/store/discharge will be discussed below.

FIG. 1 schematically illustrates a part of an electricity grid including an energy store device.

Clearly, a real electricity grid is a complicated network. So for simplicity of the diagram, FIG. 1 shows only a single electricity generator 10, a single electricity consumer 20, a power transmission line 30 linking the generator 10 and the consumer 20, and an energy store 40 connected to the power transmission line 30. As mentioned, it will be appreciated that a real electricity grid may include many different generators, a large number of consumers and a potentially complicated set of power transmission lines linking the generators and consumers, sometimes with so-called electricity distributors interposed between generators and consumers. However, the general principles associated with the embodiments can be described with reference to the simplified grid arrangement shown in FIG. 1.

In operation, at a basic level the generator 10 provides electricity via the transmission line 30 to the consumer 20. However, in an alternative mode, the energy store 40 can store some of the electrical energy generated by the generator 10 in an electricity storage arrangement such as one or more batteries. For example, the energy store 40 may store electricity generated by the generator 10 at times of low demand by the consumer 20 which may in turn be reflected by low pricing set by the generator 10. At times of high demand by the consumer 20, and therefore times of high electricity price, the energy store 40 may release energy to the grid, for example by discharging or partially discharging the batteries and providing the energy released by the discharging operation to the transmission line 30. This released energy can be used to at least supplement the electricity output from the generator 10 in serving the instantaneous needs of the consumer 20.

Figure 2:
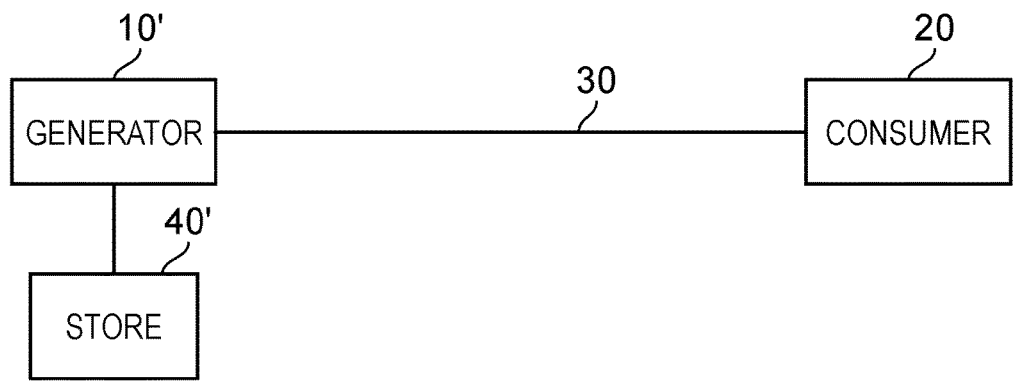
FIG. 2 schematically illustrates an electricity generator having an energy store device.
Figure 3:
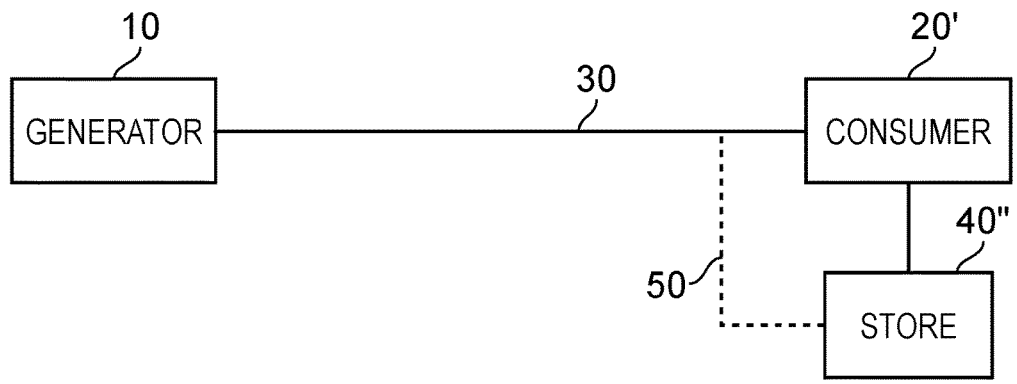
FIG. 3 schematically illustrates an electricity consumer having an energy store device.

In FIG. 1, the energy store 40 is shown as a stand-alone system connected to the transmission line 30 which in turn represents a connection to the electricity grid. Different arrangements are shown in FIGS. 2 and 3. In particular, FIG. 2 schematically illustrates an electricity generator having an energy store device, and FIG. 3 schematically illustrates an electricity consumer having an energy store device.

Referring first to FIG. 2, the generator 10' has an associated energy store 40'. This means that the generator 10' may control and use the energy store 40' as part of the generating process. At any instant in time, the electricity supplied by the generator 10' to the transmission line 30 may originate from a generating device such as a turbine or a solar panel, or may be recovered from energy which was previously stored by the energy store device 40'.

In FIG. 3, it is the consumer 20' which has an associated energy store 40". Using this arrangement, at any instant in time, the consumer may be providing energy to the energy store 40" for storage, or drawing energy from the stored energy held by the energy store 40".

In fact, the differences between the arrangements of FIGS. 1-3 may be more semantic than real. In many respects, it does not matter where an energy store is physically situated, or at least the physical position may be entirely unrelated to the question of which party controls, pays for and benefits from the use of the energy store. For example, the energy store 40 in FIG. 1 may be under the control of the organisation running the generator 10, of the consumer, or of a third party. With regards to FIG. 2, although the energy store 40' is shown directly connected to the generator 10', it need not be co-sited with the generator 10' but could be a remote device under the control of the generator 10'. In FIG. 3, even if the energy store 40" is sited at the consumer's premises, this still does not mean that it is under the control of the consumer. For example, the energy store 40" could be implemented as part of a domestic consumer's meter arrangement so as to act under the control of the electricity generator or of a distribution company, to provide for balancing out peaks and troughs in that consumer's individual electricity consumption and/or to generate income (and/or allow for a lower user tariff) by storing electricity at cheap times of the day and returning it to the grid (or to the consumer) at more expensive times of the day. Indeed, the energy store 40" could be sited at the consumer's premises but in fact have a direct connection to the grid, shown schematically as a broken line 50.

In some situations, energy losses due to inefficiencies in the charging-storing-discharging operation of the energy store can actually be at least partially alleviated, in the sense that much of the "lost" energy is released as heat, and it is possible that this heat can be used to contribute to space heating or water heating at the location at which the energy store is situated. If this is the case, then the location can in principle be billed or charged for the contribution of heat from losses in the energy store. Such charges can be used to offset the inefficiencies relating to system losses in the energy store.

So, it will be seen that many different options are possible in terms of the siting and control of the energy stores. It will also be appreciated that different scales of device are appropriate to different uses. For example, for an energy store such as the store 40" of FIG. 3, which is sited at a consumer's premises, it would be desirable that the device itself is physically reasonably compact, for example no larger than a small suitcase. Using current battery technology this would limit the ability to store energy to an amount of a few kWh. On the other hand, an energy store such as the store 40' associated with a generator might appropriately be rather larger, both in physical size and in storage capacity. However, in either case, the algorithm or decision-making process for selecting when to charge and when to discharge the energy store is subject to the same general considerations.

Figure 4:
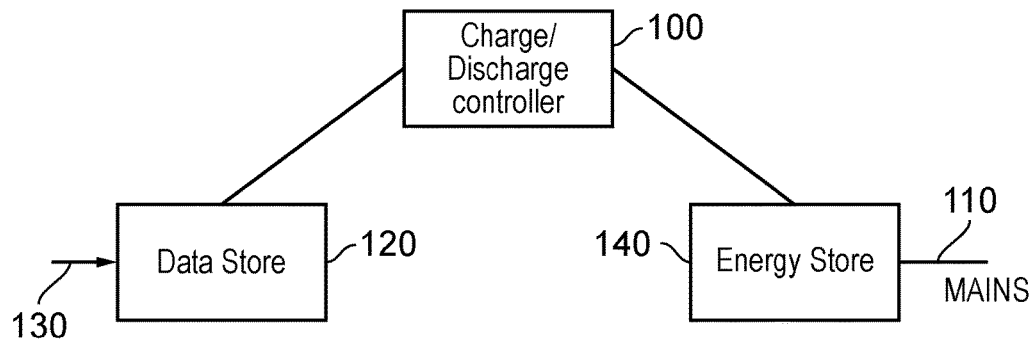
FIG. 4 schematically illustrates an energy store device.

FIG. 4 schematically illustrates an energy store device, and FIG. 5 schematically illustrates parts of the device in greater detail.

Referring to FIG. 4, the energy store device comprises a charge/discharge controller 100 which can access a data store 120 which stores a time sequence of pricing data retrieved, for example by an Internet data connection 130, from a source of pricing data such as an electricity distribution company. The charge/discharge controller 100 controls the charging or discharging of an energy store 140 according to the pricing data stored in the data store 120. The energy store 140 is connectable by one or more electrical connections 110 to the grid (or, in terms of the schematic representations of FIGS. 1-3, to the transmission line 30). Note that all of the items in FIG. 4 can receive their operating power from the electricity grid or another source, independent of the fact that the energy store 140 is connectable to the grid to store and provide energy from/to the grid.

Figure 5A:
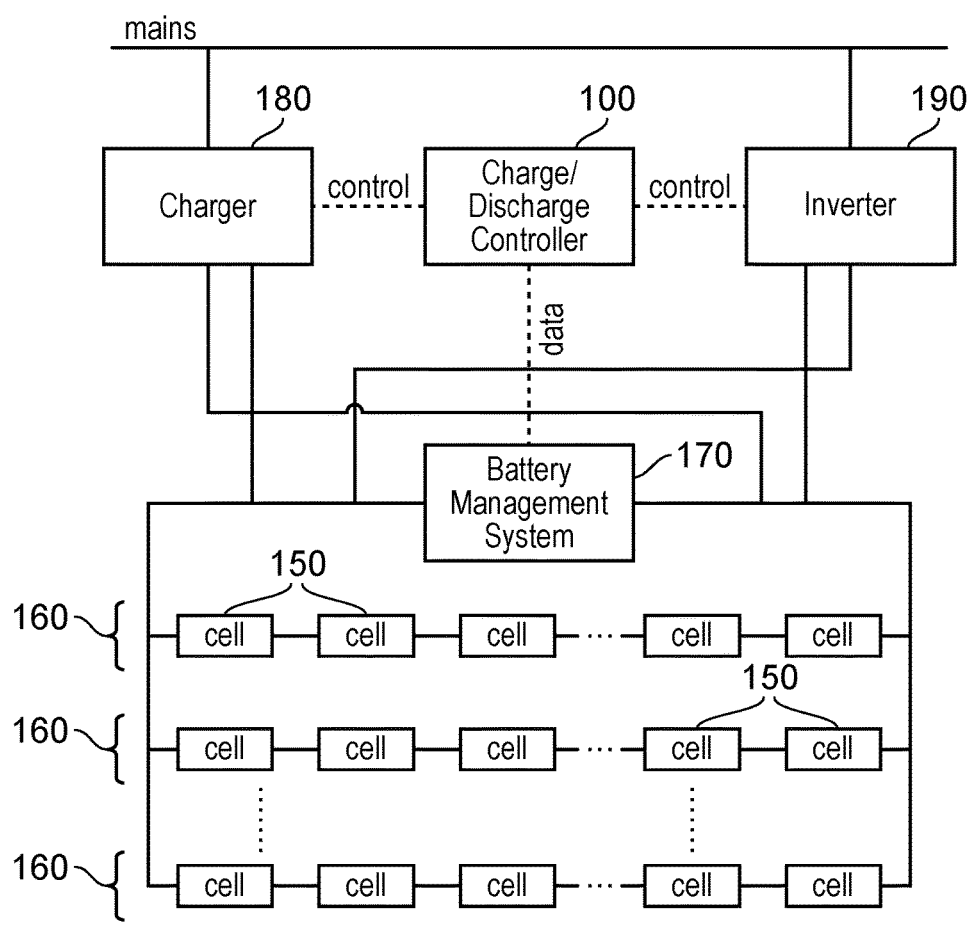
FIGS. 5a and 5b schematically illustrate aspects of the device of FIG. 4 in greater detail.

FIG. 5a provides a more detailed schematic example of the energy store 140. An array of secondary electrical cells 150 such as Lithium-Ion cells are interconnected in a series/parallel arrangement so as to provide one or more batteries at a required operating voltage. The batteries are connected to a battery management system (BMS) 170, an inverter 190 and a charger 180.

For example, if each cell has a notional operating voltage of, say, 3 V, and the system as a whole has a required operating voltage of, say, 48 V, then the cells may be arranged as a set of parallel-connected batteries 160, each battery comprising a series-connected chain of 16 cells 150.

The battery management system (BMS) 170 calculates the charge in each battery and keeps track of the individual cell voltages, such that the BMS 170 may signal to the charge/discharge controller 100 whether charging or discharging needs to temporarily stop in order to avoid an imbalance of charging states between cells. The BMS 170 will also typically pass the battery terminal voltage, the estimated charge, a battery serial number and/or possibly other data as a data signal to the charge/discharge controller 100.

The charger 180 receives electrical energy from the grid, for example at a so-called "mains" voltage which represents the nominal voltage provided to domestic consumers in the country of use. For example, the mains voltage may be 230 or 240 V, but could be as low as 110 V. Generally speaking, mains power is provided as AC power, whereas the cells 150 operate in a DC manner. So, the charger 180 has three main functions: it steps down the mains voltage to the operating voltage of the batteries 160, it stabilises the stepped-down voltage against any variations in the mains voltage, and it provides a smoothed output voltage despite the fact that its input was an AC signal.

The inverter 190 provides a generally opposite function to that of the charger 180. The inverter 190 receives a DC voltage from the batteries 160 and converts that into a (generally higher) output AC voltage. For example, the inverter 190 may receive a 48 V DC supply from the batteries 160 and converts it using known inverter techniques into an output AC mains voltage. The output of the inverter 190 is returned to the grid, and/or to a consumer for local use.

The charger 180 and the inverter 190 operate under the control of the charge/discharge controller 100 so as to come into operation at charging or discharging times set by the charge/discharge controller 100.

Figure 5B:
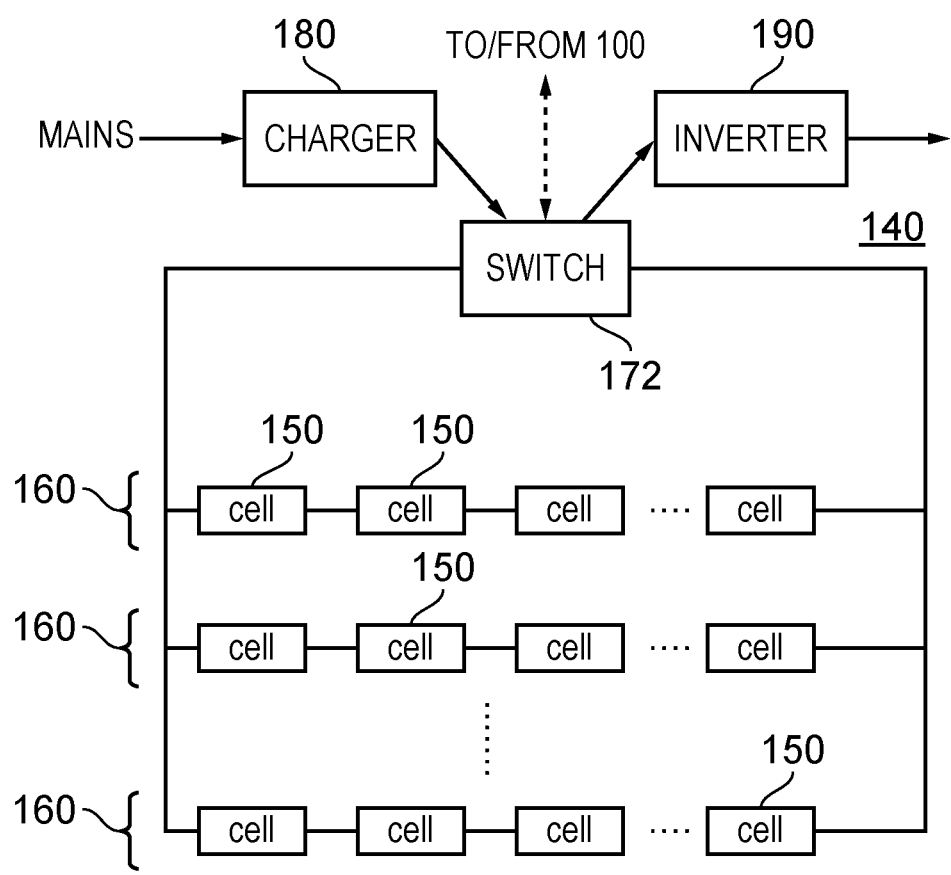

FIG. 5b schematically illustrates a different example arrangement, in which a switch 172 controls whether the electricity storage arrangement formed of the batteries 160 is connected to the charger 180, the inverter 190 or neither. The switch operates under the control of the charge/discharge controller 100. As discussed above, the function of the switch 170 can include sending data to the charge/discharge controller 100, so as to indicate the current state of charge of the batteries 160. This feature is optional; the charge/discharge controller 100 can, in some embodiments, derive the state of charge of the batteries 160 analytically, based upon information held by the charge/discharge controller 100 indicating recent charging and discharging cycles. However, in an alternative, the switch 170 can include a detector which detects the current charging state of the batteries 160, for example by monitoring their output voltage under a no-load or a test-load condition.

Figure 6:
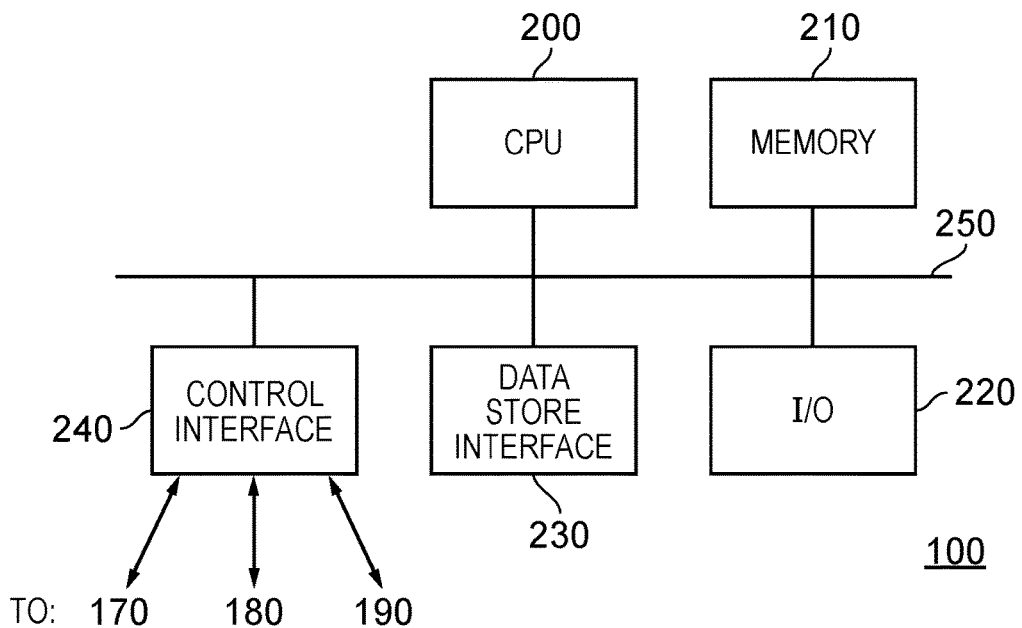
FIG. 6 schematically illustrates a charge/discharge controller.

FIG. 6 schematically illustrates the charge/discharge controller 100 in more detail. The context of FIG. 6 is the arrangement of FIG. 5a, though the skilled person will appreciate that a similar arrangement could apply to the system of FIG. 5b.

As mentioned above, the charge/discharge controller 100 controls the operation of the BMS 170, the charger 180 and the inverter 190, for example via a control interface 240. The charge/discharge controller 100 comprises a microprocessor (CPU) 200; memory 210 such as a machine-readable non-transitory storage medium (for example, a read-only memory, a non-volatile random access memory, a magnetic disk medium or an optical disk medium) for storing program code to control the operation of the charge/discharge controller 100, and which may also include working memory for temporarily storing data for use in calculations carried out by the CPU 200; an input/output interface 220; a data store interface 230 for interfacing with the data store 120; and the control interface 240 operating under the control of the CPU 200 and which passes a control signal to control the operation of the BMS 170, the charger 180 and the inverter 190. The various components of the charge/discharge controller 100 are connected together by a bus arrangement 250.

In operation, the CPU 200 executes program code stored in the memory 210 to access pricing information via the data store interface 230. In at least some embodiments, the CPU 200 also accesses data indicative of the current charging state of the batteries 160, which (as described above) may be accessed from the BMS 170, for example via the control interface 240. Alternatively, the CPU 200 can derive an analytic indication of the current charging state of the batteries 160 based upon previously executed charging and discharging cycles. Based on these data, the CPU 200 sets the time of the next charging or discharging cycle, as the case may be, and at that time controls the control interface 240 to operate the charger 180 or the inverter 190 as appropriate to provide a charging or discharging cycle. In general terms, if the batteries are more than 50% charged, the next cycle would normally be a discharging cycle. If the batteries are currently less than 50% charged, the next cycle set by the CPU 200 would normally be a charging cycle.

The input/output interface 220 provides a data connection with an external device or devices. For example, the charge/discharge controller 100 may interact with a generator or distribution company so that the generator or distribution company can (for example) overrule certain charging or discharging operations which would otherwise be planned by the CPU 200. In another arrangement, the input/output interface 220 can provide a data output to a local user, for example in the form of a data display indicating matters such as the next planned charging and discharging cycles and/or the current charging state of the batteries 160.

In a further possibility, some of the functionality which is currently being described as carried out by the CPU 200 could in fact be carried out remotely, so that the timing of the charging or discharging cycles is set using the algorithm to be described below but with the algorithm being carried out at a remote location other than the local charge/discharge controller. The timing data is then transmitted to the local charge/discharge controller 100 using the input/output interface 220, to be implemented by the CPU 200 and the control interface 240.

Figure 7:
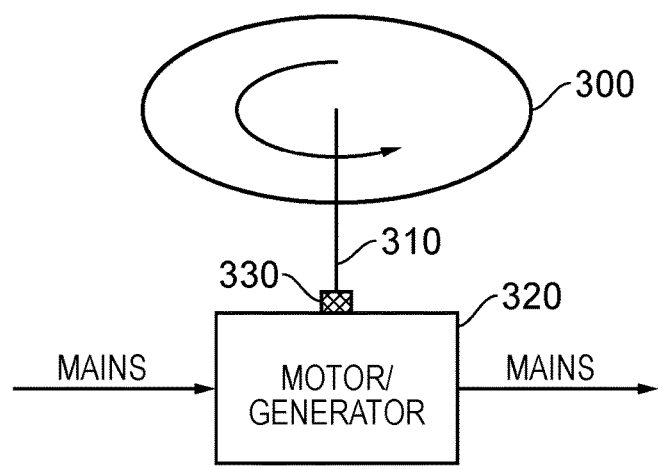
FIG. 7 schematically illustrates a mechanical energy store.

FIG. 7 schematically illustrates one example of a mechanical energy store, comprising a flywheel 300 connected by a power distribution shaft 310 to a motor/generator arrangement 320. Here, it is noted that in some instances, a motor can be operated "in reverse" so as to act as a generator of electricity when driven by a mechanically rotating power source. So, in the current example, when it is desired to "charge" the apparatus, that is, to store energy using the system of FIG. 7, the motor/generator 320 acts as a motor to drive the flywheel 300 in a rotary motion. When power is disconnected from the motor/generator 320, the flywheel 300 continues to rotate. A clutch arrangement 330 may be provided to disconnect the shaft 310 from the motor/generator 320 when the motor/generator 320 is not acting as either a motor or a generator. By doing this the clutch arrangement 330 can reduce mechanical losses in the system over time.

Generally speaking, a large flywheel 300 may continue to rotate for a long period after the mechanical driving force provided by the motor/generator 320 has been removed. This provides an energy store by storing energy in the form of rotational kinetic energy. The system can be "discharged", or in other words the stored energy retrieved as electrical energy, by using the clutch arrangement 330 to connect the rotating the 300 to the motor/generator 320 which then acts as a generator to produce output electrical power.

Although steps can be taken to reduce mechanical losses in the system of FIG. 7, it will be apparent that in most instances the flywheel 300 will gradually slow down. In a similar way, if the batteries 160 of FIG. 5 are left for a long enough time, they may progressively self-discharge. This feature is not true of all energy storage systems; for example, a system involving pumping water from a lower to a higher level need not suffer any time-dependent energy losses. But for example systems which do have the potential of a decaying amount of stored energy, particular considerations will be discussed below.

Before an algorithm for selecting times for charging and discharging an energy store device is discussed in detail, general aspects of pricing data and device efficiency will be discussed.

Figure 8:
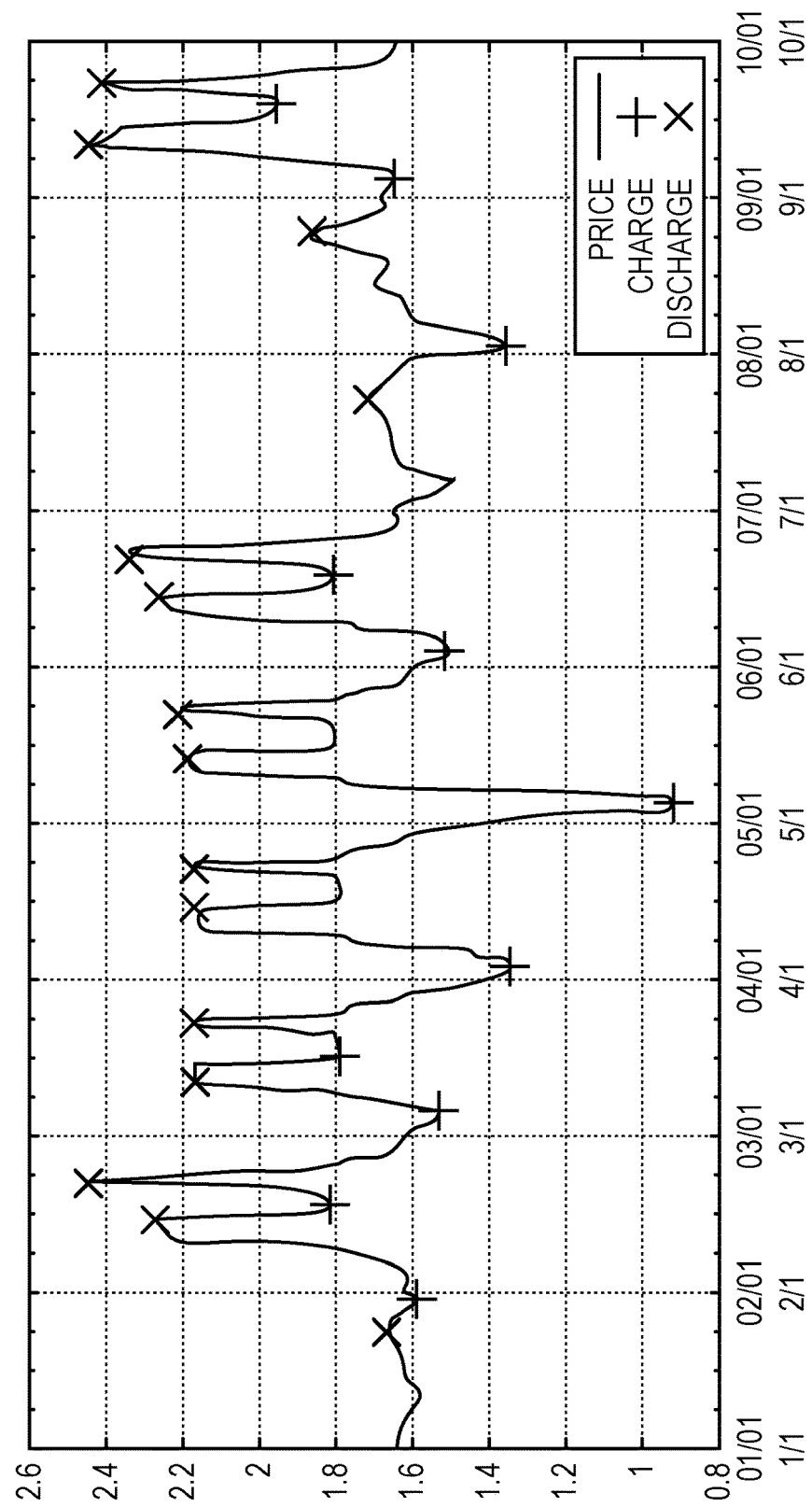
FIGS. 8-10 schematically illustrate example charging and discharging times within a published pricing structure, depending upon the "round-trip" efficiency of the charging, storage and discharging system in use.
Figure 9:
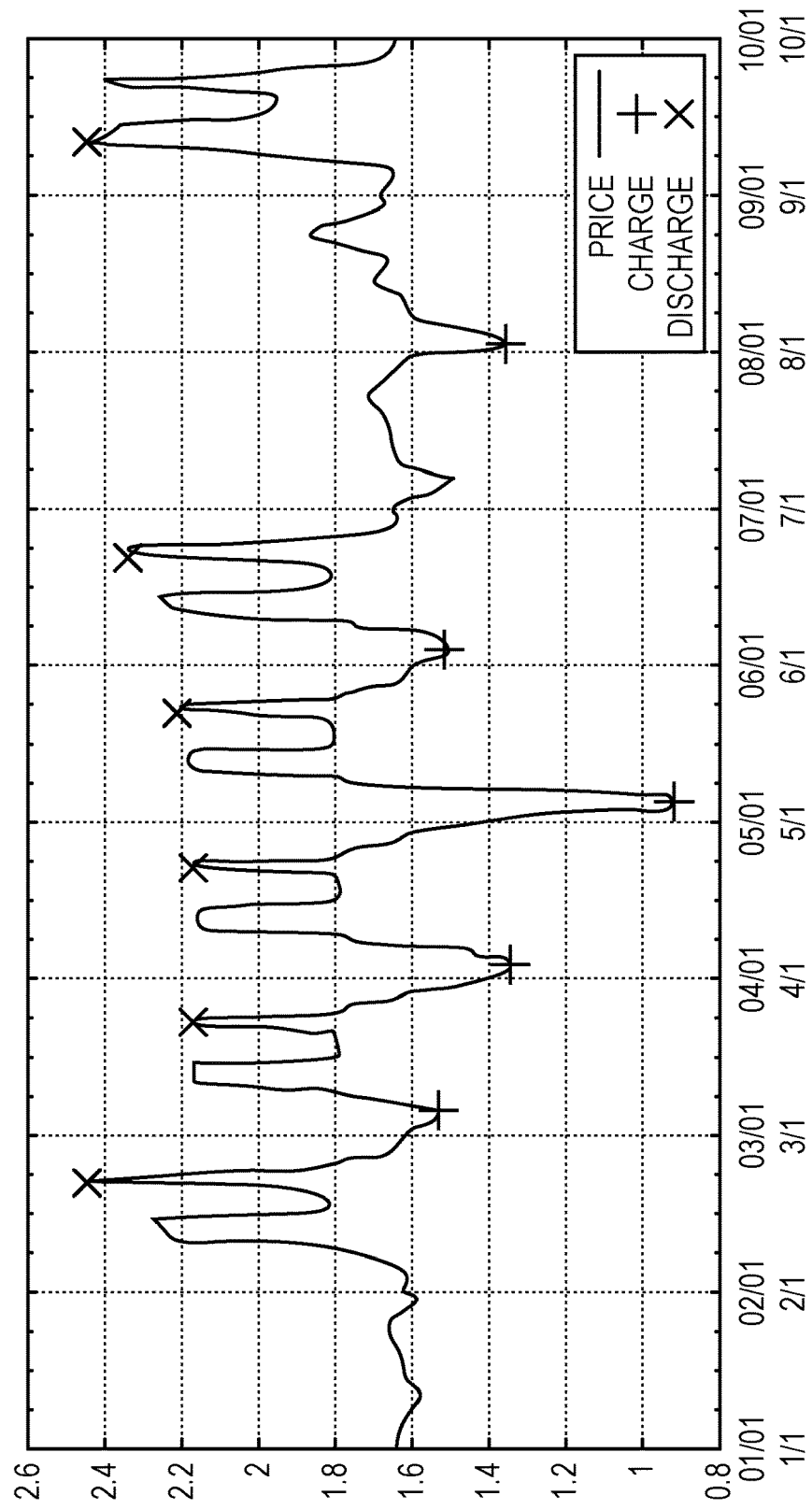
Figure 10:
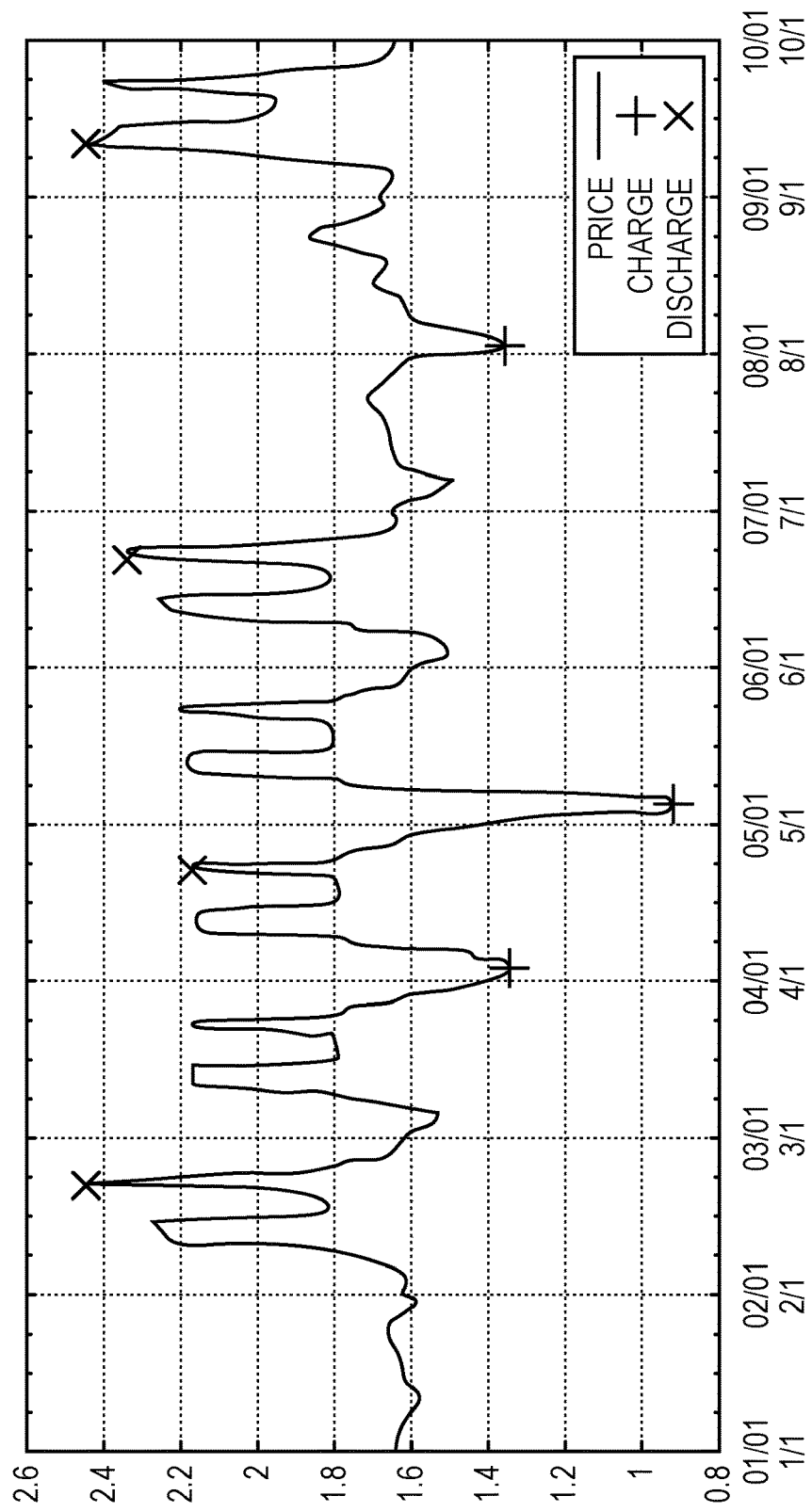

FIGS. 8-10 schematically illustrate example charging and discharging times within a published pricing structure, according to the efficiency of the charging, storage and discharging system in use.

The pricing data used in these examples comprises a time sequence of data and relates to a nine-day period in an example market, and include transmission and distribution costs dependent upon the time of day. The horizontal axis of each chart varies from the start of 1 January through to the end of 9 January, and the vertical axis of each chart relates to an arbitrary cost scale. The three separate charts relate to different system efficiencies (Eff, as discussed above). Time positions at which a charging cycle is selected are shown by the symbol "+" and time positions at which a discharging cycle is selected are shown by the symbol "X".

In FIG. 8, the system efficiency is 95%. Here, it makes economic sense to charge and discharge frequently, sometimes twice a day, even when the price variation is limited (for example, on 1 January in the example data).

In FIG. 9, the system efficiency is considered as 75%. Here, it makes sense to charge and discharge once a day during working days, and not during the weekend (for example, 7/8 January) when the price variation is somewhat flatter. It can be seen that on working days there are (in this example) two distinct price peaks per day, but at 75% efficiency the local minimum (the dip between those peaks) is not sufficiently deep to allow an extra charge and discharge cycle. This is because the losses incurred due to charging, storing and discharging are such that the gain which can be made by charging when the electricity is cheap and discharging when the electricity is expensive is not sufficient to overcome the cost associated with the losses.

This situation is shown more dramatically at 65% efficiency (FIG. 10), when it is relatively infrequent that it makes economic sense to charge and discharge the energy store.

Figure 11:
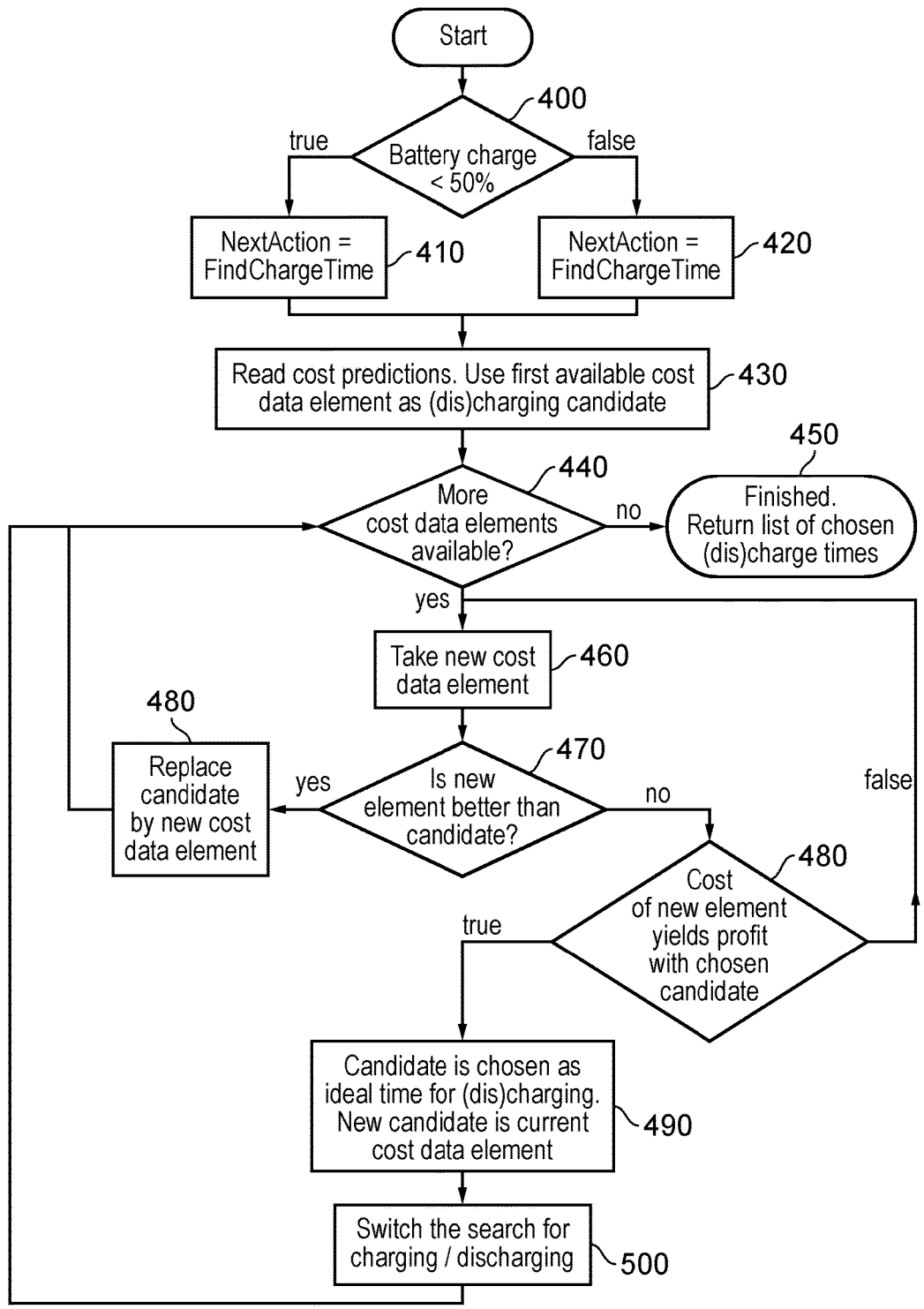
FIG. 11 is a schematic flowchart illustrating operations of a charge/discharge controller.

An example of an algorithm for operation of the charge/discharge controller 100 will be discussed below with reference to FIG. 11. The algorithm will be described with reference to the charging of one or more batteries (such as the batteries 160) but may of course be applied to other energy storage arrangements such as the mechanical system of FIG. 7. The algorithm provides a method of controlling storage of electrical energy by charging and discharging and energy storage device in response to pricing data indicative of future prices of electrical energy over time and energy losses (for example, being indicated by an efficiency measure Eff) caused by charging and discharging the energy storage device. Such an energy storage device may be of the form described above.

The algorithm to be discussed will inspect a data set of n price samples and, given a particular roundtrip efficiency Eff, it will return a list of ideal charging and discharging times. The algorithm works with a complexity of O(n), meaning that when the size of the data set doubles, the processing time doubles.

The charging and discharging times are detected as alternating occasions, so that a charging occasion is followed by a discharging occasion, and a discharging occasion is followed by a charging occasion. Initially the occasions are detected as candidates which are then "validated" using a process to be described below. Validation of the candidate occasions implies confirming or setting that occasion as one which will not be further altered by the current execution of the algorithm and which is an occasion on which the energy storage device will be charged or discharged as appropriate.

First, at a step 400, the CPU 200 determines whether the algorithm needs to look for a price minimum first (i.e. to charge the batteries) or for a price maximum (i.e., to discharge the batteries) as a first of the occasions. In some embodiments, this may depend on whether the current battery charge is more or less than 50%. So, if the current charge level is less than 50%, then the next cycle should charge the batteries, whereas if the current charge is greater than 50%, then the next cycle should discharge the batteries. However, thresholds other than 50% can of course be used, such as 40% or 60%. Also, in some embodiments a more complicated approach to setting the threshold can be used instead of a simple pre-set threshold; such an optional approach will be described below.

If the batteries are considered by the step 400 to be "discharged" then the first cycle is set to be a charging cycle at a step 410. If the step 400 considers the battery to be "discharged" by applying the threshold, then control instead passes to the step 420 at which the first cycle is set to be a discharging cycle. A difference between these two outcomes is that the step 410 defines the next action to be the identification of a minimum price for charging, whereas the step 420 defines the next action to be the identification of a maximum price for discharging.

At a step 430 the CPU 200 accesses the pricing data in the data store 120 and initially sets the first available cost element (price) as the candidate for charging or discharging.

At a step 440 the CPU 200 detects whether more cost data elements (prices) are available in the price data. If not, then the process finishes at a step 450 and all of the chosen or validated charging and discharging times are returned, such that charging and discharging operations of the energy store device are set according to the returned times.

However, assuming that more prices are available, control passes to a step 460 at which a next cost data element (price) is considered. At a step 470, a test is carried out to detect whether the newly considered element is better than the current candidate for charging or discharging. Here, the term "better" means that the price of the newly considered cost data element is lower than the current candidate (for charging) or higher than the current candidate (for discharging). If the newly considered cost data element is in fact better than the current candidate, then at a step 480 the current candidate is replaced by the newly considered cost data element and control returns to the step 440.

In this way, a next occurrence of a locally minimum price is selected as a candidate charging occasion or a next occurrence of a locally maximum price in the time sequence of pricing data is selected as a candidate discharging occasion. Note that this test continues to be applied until the candidate occasion is validated, so that validating a candidate charging or discharging occasion comprises detecting whether the price at that occasion indicated by the pricing data relating to that candidate occasion represents the respective lowest or highest price before the later price which validates that candidate occasion. If not, the candidate occasion is replaced by the respective lowest or highest price before the later price which validates that candidate occasion.

If, at the step 470, the new element is not better than the current candidate, then control is passed to a step 480 at which a comparison is made to detect whether the cost (price) associated with the new element would yield a profit with the current candidate, or is at least sufficient to compensate for the energy losses caused by charging and discharging the energy storage device. This process is referred to as "validating" or confirming a candidate occasion.

In particular, a test is applied to detect whether, given the current system efficiency, it is profitable to charge at the charging candidate or discharge at the discharge candidate times, based on the next discharge or charge time being that of the new element. The test applied is whether $P_D > P_C/\text{Eff}$. If so, then the charge or discharge candidate is validated at a step 490 and is now treated as a "charge decision".

If the outcome of the test at the step 480 is false, control passes back to the step 460 so that a new cost data element may be considered. If, however, the outcome of the test at the step 480 is positive, then at a step 490 the current candidate is chosen or validated as a charging or discharging time, and the current cost data element under consideration is set as a next candidate time and price. At a step 500 the search is switched so that if the previous search was for a charge candidate, the new search is for a discharge candidate, or if the previous search was for a discharge candidate, the new search is for a charge candidate. Again, control returns to the step 440.

Note that in embodiments, the search for a local minimum and the validation of that minimum are not treated as a sequence of two separate operations. Instead, the algorithm is continuously searching for a minimum and updating a current candidate if a better minimum is found, while at the same time searching for a later price which is high enough to validate the candidate minimum. Accordingly, one aspect of the elegant power and simplicity of the present algorithm lies in the fact that both the search for a minimum and the search for a maximum to validate that minimum (and thereby to become a candidate maximum) occur at the same time.

Once all the validated charging and discharging occasions have then set, the energy storage device is charged and discharged at those occasions, respectively. This takes place under the control of the charge/discharge controller 100 as described above.

The steps described above can be carried out by the charge/discharge controller, and in particular by the CPU 200 of the charge/discharge controller, which therefore acts as a detector to detect alternating candidate charging and discharging occasions, a validator for validating a candidate charging or discharging occasion and a charge controller to control charging or discharging of the energy storage device.

Figure 12:
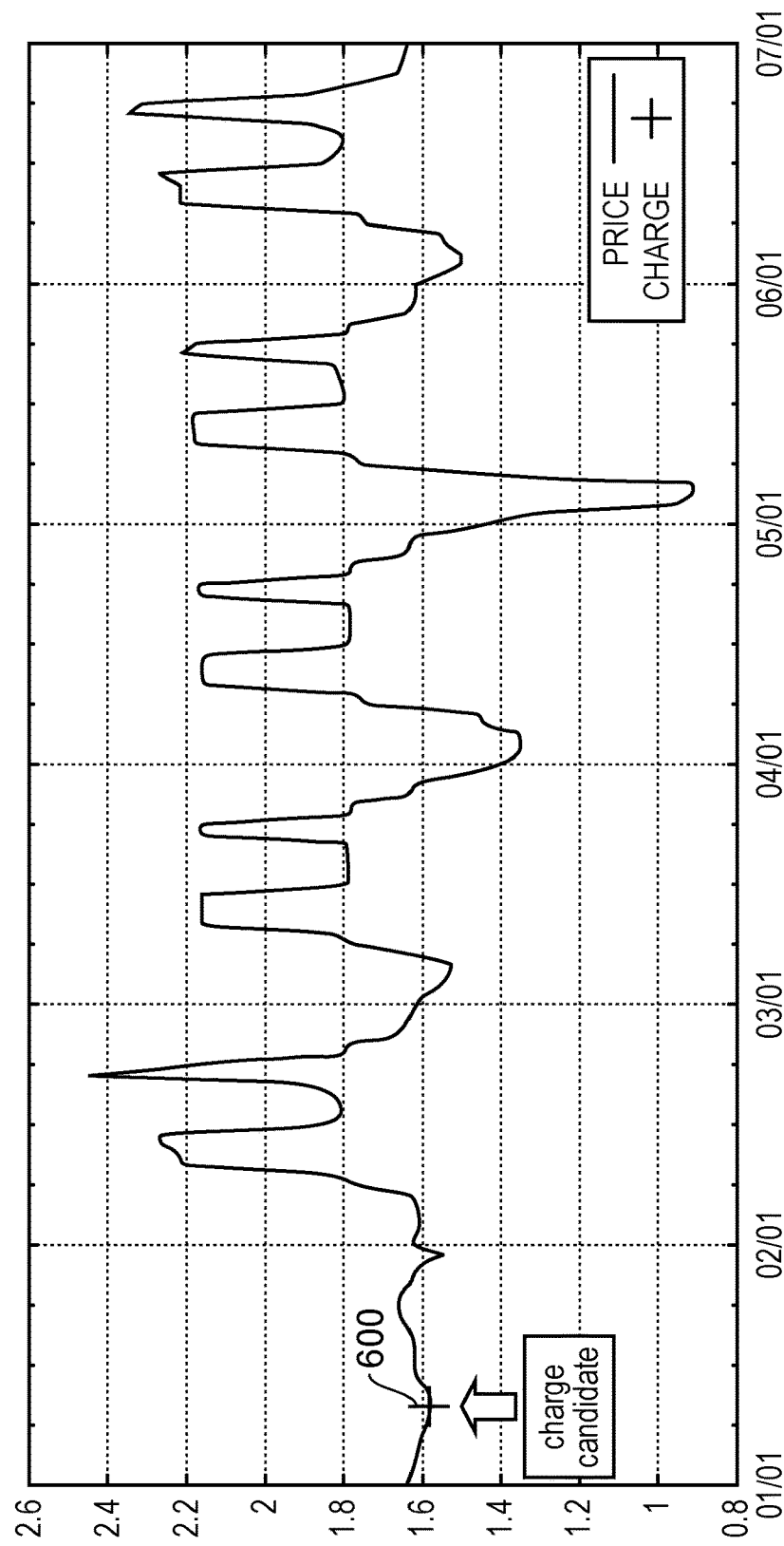
FIGS. 12-16 schematically illustrated charging and discharging decisions made using the flowchart of FIG. 11.
Figure 13:
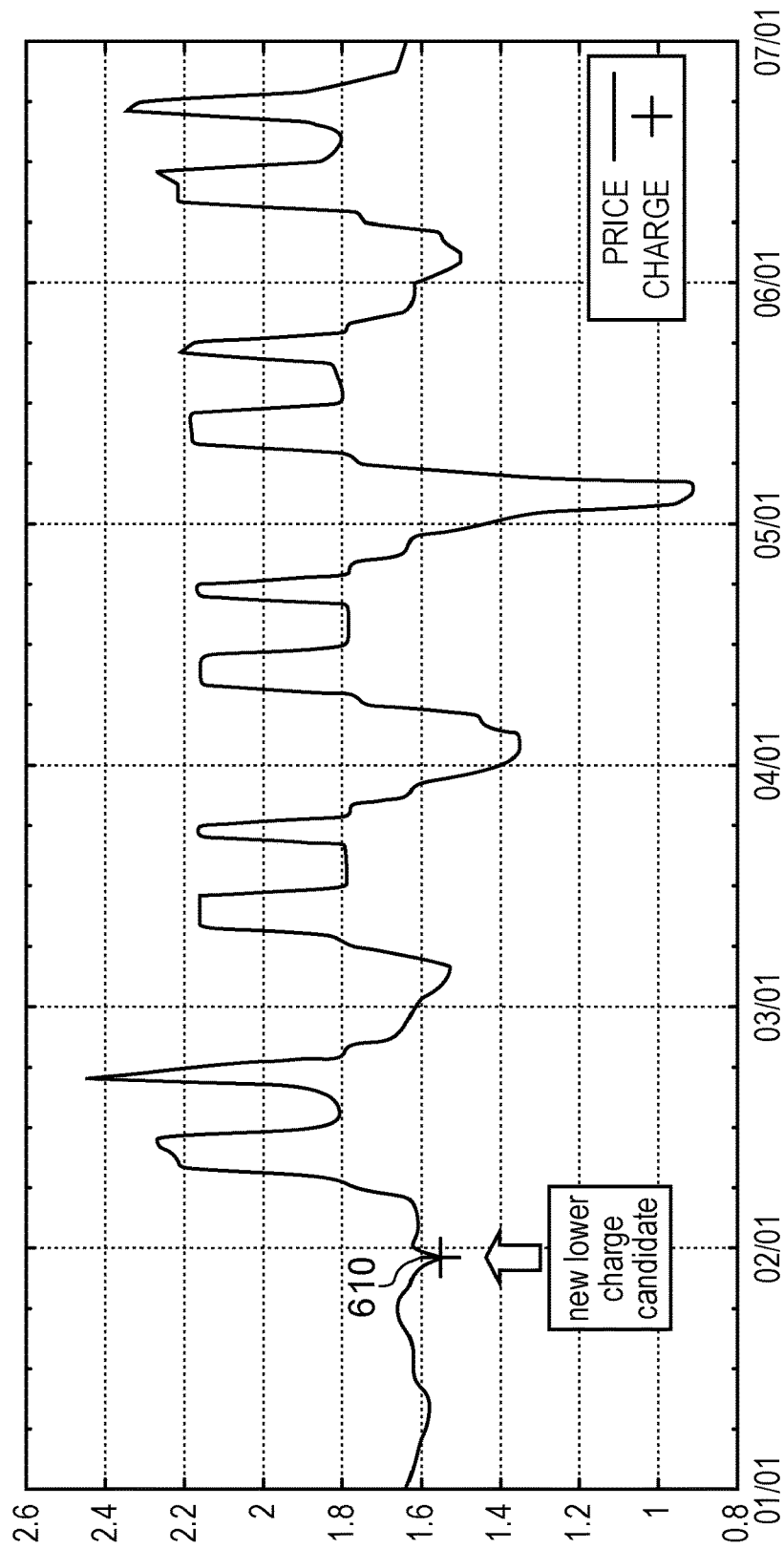
Figure 14:
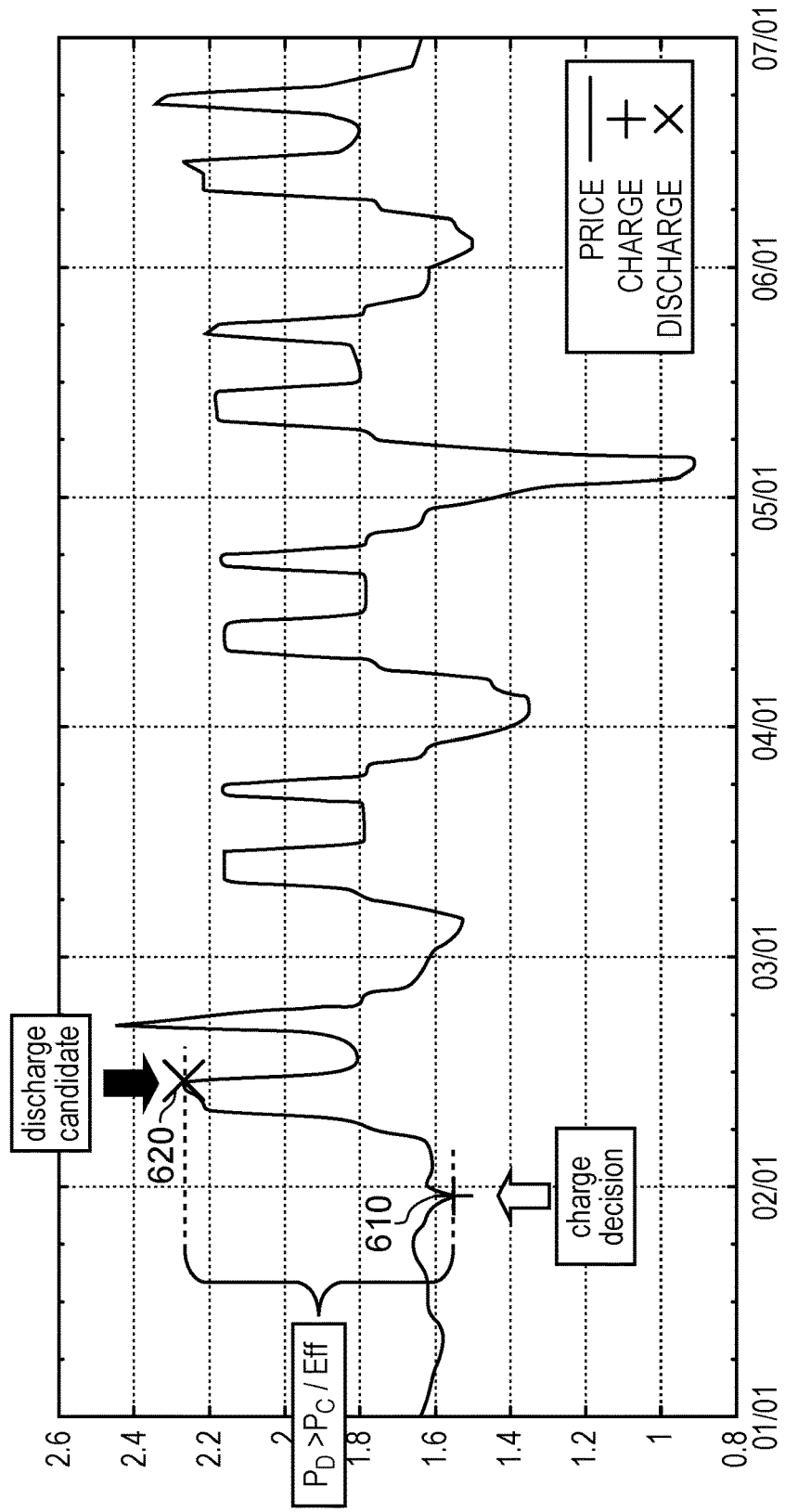
Figure 15:
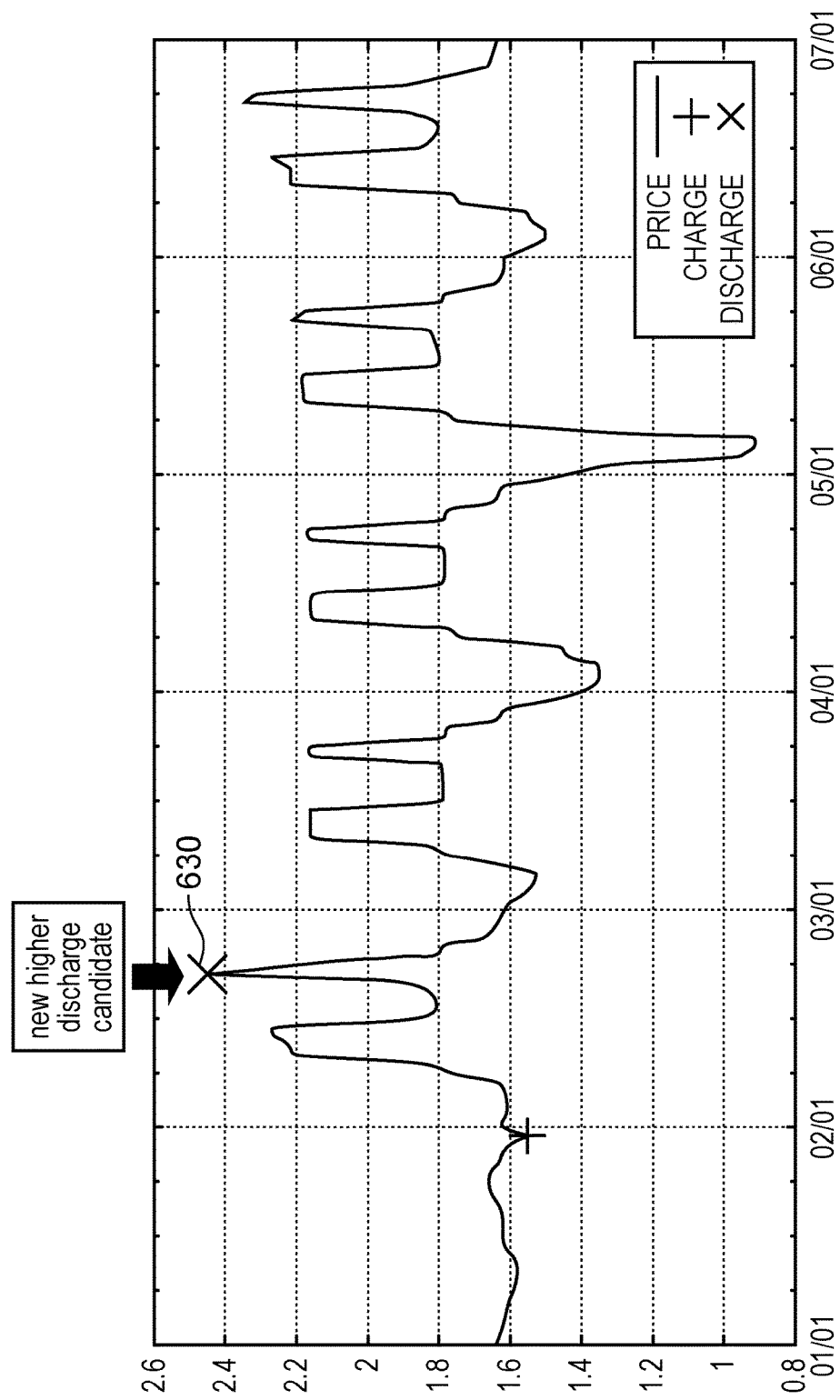

FIGS. 12-16 schematically illustrate steps in this process. FIG. 12 schematically illustrates a charge candidate time 600 identified as a first local minimum, assessed in ascending time order from the current time (the left-hand end of the horizontal axis). The local minimum is identified by the repeated application of the steps 460, 470, 480, 440, until the outcome of the test at the step 470 is negative.

The step 480 is then applied. Until a maximum is found which validates the local minimum 600, each new cost data element is checked (at the step 470) to detect whether it is better (lower, in this instance) than the current candidate. During this search, a new lower-priced minimum is identified in the pricing data and so this time (610, FIG. 13) is now treated as the charging candidate.

The step 480 continues to be applied to find a maximum which will allow profitable operation in respect of the candidate charging time 610. Eventually, a cost data element 620 (FIG. 14) is detected for which, given the current system efficiency, it is profitable to charge at the charging candidate and discharge at the current data element times. The test applied is whether $P_D > P_C/\text{Eff}$. If so, then the charge candidate 610 is validated and is now treated as a "charge decision" at the step 490. Also at the step 490, the cost data element which provided the successful validation (the element 620) becomes the new candidate for discharging.

The search continues, at each iteration checking whether a next cost data element is a better (higher priced) discharge candidate and, if not, whether the cost data element validates the current discharge candidate (the test at the step 480). A new, higher priced discharge candidate 630 is identified (FIG. 15) by the step 470 before the test at the step 480 is passed.

Figure 16:
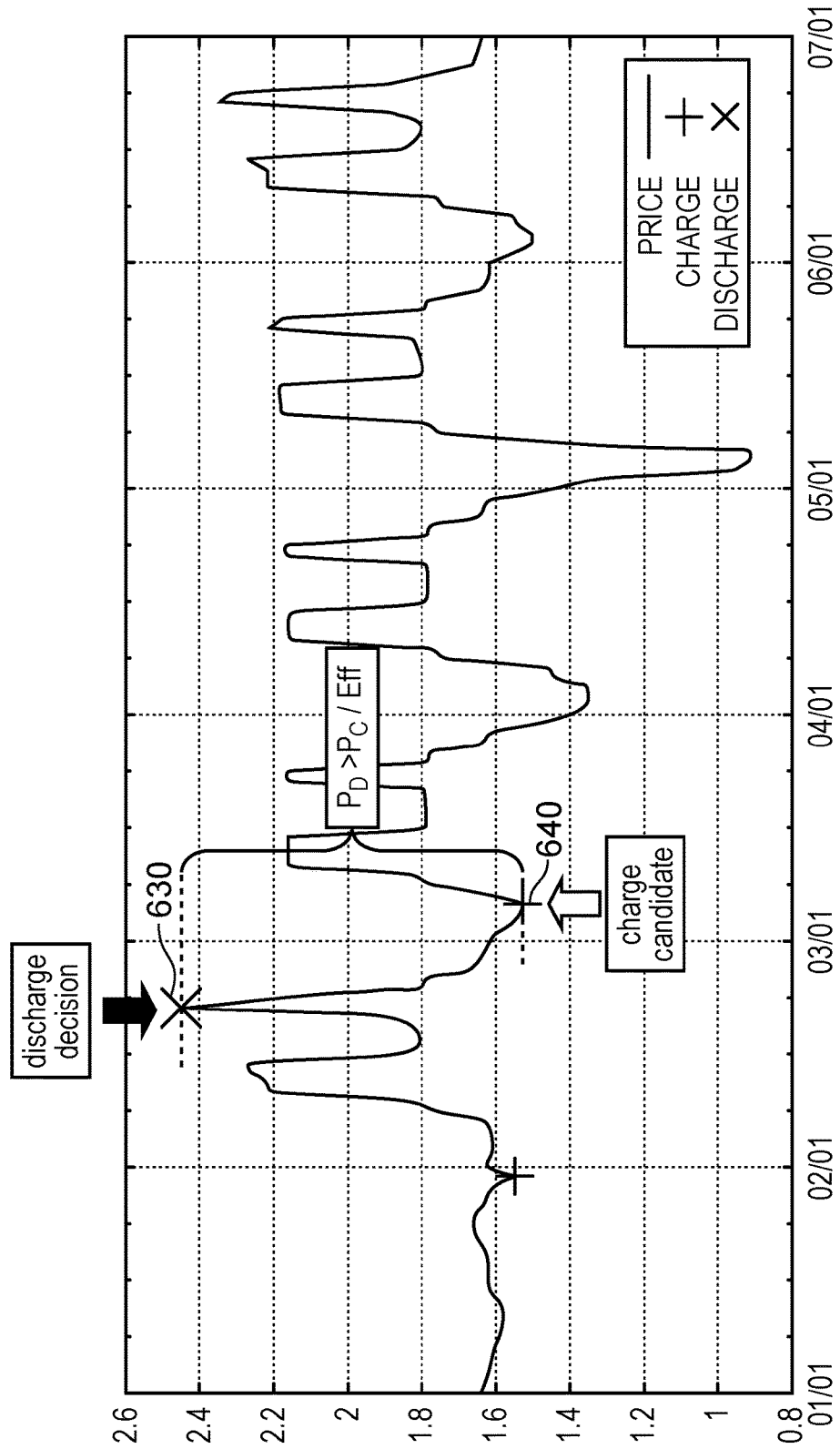

FIG. 16 illustrates the validation of this discharge candidate 630 by identifying a next occasion (a cost data element 640) at which profitable operation can take place. The validation process involves checking that the price difference achievable between the discharge candidate and the charge candidate is positive (that is to say, the discharge-charge cycle would be profitable) by again testing whether $P_D > P_C/\text{Eff}$, where $P_D$ represents the price at the discharge occasion, $P_C$ represents the price at the charging occasion, and Eff represents the efficiency of the charging and discharging of the energy storage device such that Eff is equal to the ratio of energy retrieved at discharging to energy input at charging. If so, the discharge candidate 630 is validated as a discharge decision and the element 640 becomes (at the steps 490 and 500) the next charging candidate, and so on.

Further developments of the algorithm will now be described.

The version of the algorithm described above will only output an ideal charging and discharging time or instant, without taking into account that charging and discharging takes a certain non-zero amount of time, during which the price may change.

An extension of the algorithm can therefore be used which will instead of the actual price, use a time average such as a sliding window average of the price over a predetermined time period (window), the window size (in time) being a predicted duration of charging and discharging, which may be set as a predetermined time period.

Also, it is noted that Lithium-Ion batteries (as an example of the batteries 160) are typically charged with a constant current phase, followed by a constant voltage phase. This means that the power drawn by the charging process will diminish towards the end of charging.

Therefore, the algorithm can be modified to use a convolution product of the charging power with the electricity price instead of the sliding window average. In other words, the validating process is operable to integrate the cost of electricity consumption against time over a charging cycle to detect the price associated with a charging occasion. A similar process could be applied to the energy released on a discharging occasion. This will result in charge/discharge decisions which will take into account that the power used towards the end of the charging period is less than at the beginning of the charging period.

If:

P(t) is the charging or discharging (negative number) power at time t.

$P_C(t)$ is the electricity consumption price at time t.

$P_D(t)$ is the electricity production price at time t.

Then:

$$C(t) = \int_t^{t+\Delta t} P(t') P_C(t') dt'$$

is the cost for charging the battery, starting at time t for a duration $\Delta t$.

and:

$$D(t) = \int_t^{t+\Delta t} P(t') P_D(t') dt'$$

is the gain of discharging the battery, starting at time t for a duration Δt.

Similarly to the simple algorithm, a charge/discharge cycle is profitable, only if $$D(\text{discharge time}) > C(\text{charge time})/\textit{Eff}.$$

A further development, which may be treated separately or combined with the above developments, relates to accounting for time-dependent storage energy losses and in particular to apply, as part of the validation process, a time-varying energy loss relating to a charged energy storage device in dependence upon an elapsed time since the last charging occasion.

The algorithm described above can be used for charging batteries as well as for mechanically storing energy by speeding up rotating masses (such as a flywheel as described above) as a physical electricity storage system. Both batteries and spinning masses will lose some of their energy (charge in the case of batteries or rotational speed and therefore rotational energy for spinning masses) over time. Also, the energy storage devices and charge/discharge controller will typically themselves have a non-zero power consumption. This power consumption can also be regarded as a time dependent storage loss.

The profitability equation:

$$P_D > P_C/\textit{Eff}$$

can easily be adapted to cater for these time dependent storage losses. As discussed earlier, it makes sense to charge or discharge when:

$$P_D(t) - P_C(t') > \text{Cost}$$

where $$\text{Cost} = ((1/\textit{Eff}) - 1)P_C$$

When taking the battery losses or spinning mass losses into account this becomes:

$$\text{Cost}(t_C, t_D) = ((1/\textit{Eff}) - 1)P_C(t_C) + L(t_D - t_C)P_C(t_C)$$

where

L is the energy loss in kWh/s of the battery or spinning mass

The combined equation then becomes the criterion for profitable storage:

$$P_D(t_D) - P_C(t_C) > ((1/\textit{Eff}) - 1)P_C(t_C) + (t_D - t_C)LP_C(t_C)$$

or:

$$P_D(t_D) > (1/\textit{Eff} + (t_D - t_C)P_C(t_C)$$

Using this equation to accept charge or discharge candidates will adapt the algorithm for use with a storage system that leaks energy over time.

In another development, the efficiency figure Eff can be modified so as to represent an improved (more efficient) system if the energy losses as heat in the charging/storing/discharging cycle can be sold to a customer as, for example, contributions to space or water heating.

While the discussions above have related to so-called mains voltages, it will be appreciated that corresponding techniques may be applied to grid connections at higher voltages, such as distribution voltages (which could range up to several tens of kilovolts).

Variations can be applied to the threshold charge level for deciding whether the first cycle should be a charge cycle or a discharge cycle (the step 400). For example, the electricity price at the time that the batteries were last charged can be recorded and compared with the prevailing price at the time that the algorithm is started (that is to say, at the left-hand end of the price charts as illustrated). If for example the prevailing price is lower than the price at the time that the batteries were last charged by a threshold difference, then the threshold applied by the step 400 (to decide whether the batteries are considered "charged" or "uncharged") can be set to a higher value than 50%, for example 60%, so that the batteries are more likely to be charged as a first cycle. If however the prevailing price is higher than the recorded price by a threshold amount, then the threshold applied by the step 400 can be set to a lower value, such as 40%, so that the batteries are more likely to be discharged as a first cycle.

Insofar as embodiments have been described as being implemented, at least in part, by software-controlled data processing devices, it will be appreciated that such software, and a storage device holding such software (such as, for example, a non-transitory machine-readable storage medium such as a non-volatile memory, a magnetic disk medium or an optical disc medium) are also considered to be embodiments of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective aspects and features of the disclosure are defined in the following numbered paragraphs:

1. A method of controlling storage of electrical energy by charging and discharging an energy storage device in response to pricing data indicative of future prices of electrical energy over time and energy losses caused by charging and discharging the energy storage device, the method comprising:
   detecting alternating candidate charging and discharging occasions with respect to the pricing data by selecting a next occurrence of a locally minimum price in the pricing data as a candidate charging occasion or a next occurrence of a locally maximum price in the pricing data as a candidate discharging occasion;
   validating a candidate charging or discharging occasion if the price difference between that candidate charging or discharging occasion and another later price in the pricing data is at least sufficient to compensate for the energy losses caused by charging and discharging the energy storage device; and
   charging and discharging the energy storage device at the validated charging and discharging occasions, respectively.

2. A method according to paragraph 1, in which the step of validating a candidate charging or discharging occasion comprises detecting whether the pricing data relating to that candidate occasion represents the respective lowest or highest price before the later price which validates that candidate occasion, and if not, replacing the candidate charging or discharging occasion by the respective lowest or highest price before the later price which validates that candidate occasion.

3. A method according to paragraph 1 or paragraph 2, in which the validating step detects whether:

$$P_D > P_C/\textit{Eff},$$

where $P_D$ represents the price at the discharge occasion, $P_C$ represents the price at the charging occasion, and Eff represents the efficiency of the charging and discharging of the energy storage device such that Eff is equal to the ratio of energy retrieved at discharging to energy input at charging.

4. A method according to any one of paragraphs 1 to 3, in which the pricing data used by the detecting and validating steps represents a time average of the pricing data over a predetermined time period.
5. A method according to any one of paragraphs 1 to 3, in which the validating step is operable to integrate the cost of electricity consumption against time over a charging cycle to detect the price associated with a charging occasion.
6. A method according to any one of the preceding paragraphs, in which the validating step is operable to apply a time-varying energy loss relating to a charged energy storage device in dependence upon an elapsed time since the last charging occasion.
7. A method according to any one of the preceding paragraphs, comprising the step of:
   determining whether a first of the occasions should be a charging occasion or a discharging occasion in dependence upon a present charging state of the energy storage device.
8. A method according to paragraph 7, in which the determining step comprises comparing a measure of the present charging state with a threshold amount.
9. A method according to paragraph 8, comprising the step of:
   varying the threshold in dependence upon the pricing data.
10. Computer software which, when executed by a computer, causes the computer to carry out the method of any one of the preceding paragraphs.
11. A storage medium which stores computer software according to paragraph 10.
12. An energy storage controller for controlling storage of electrical energy by charging and discharging an energy storage device, the controller being responsive to pricing data indicative of future prices of electrical energy over time and energy losses caused by charging and discharging the energy storage device, the controller comprising:
    a detector configured to detect alternating candidate charging and discharging occasions with respect to the pricing data by selecting a next occurrence of a locally minimum price in the pricing data as a candidate charging occasion or a next occurrence of a locally maximum price in the pricing data as a candidate discharging occasion;
    a validator configured to validate a candidate charging or discharging occasion if the price difference between that candidate charging or discharging occasion and another later price in the pricing data is at least sufficient to compensate for the energy losses caused by charging and discharging the energy storage device; and
    a charge controller operable to charge and discharge the energy storage device at the validated charging and discharging occasions, respectively.
13. An energy storage apparatus comprising:
    an energy storage device; and
    an energy storage controller according to paragraph 12, for controlling energy storage by the energy storage device.
14. An apparatus according to paragraph 13, in which the energy storage device comprises one or more batteries.
15. An apparatus according to paragraph 14, comprising an inverter for producing an output voltage higher than the battery voltage.
16. An apparatus according to paragraph 13, in which the energy storage device comprises a movable mass having a motor for driving the movable mass and a generator for generating electrical power from motion of the movable mass.
17. An electricity consumption meter comprising apparatus according to any one of paragraphs 12 to 15.

APPENDIX

Pseudo-code Software Implementation

```
from array import array
import time
all_prices = [(1325372400.0, 1.6494124999999999), (1325376000.0,
1.6304625000000001), [...] ]
Efficiency = 0.85
def findpeaks(CostData, StartCharge = True):
    """Function returns an array of charge and an array of discharge
    moments
        Prerequisites:
            - DayData provided is an array of (time, price) tuples,
            chronologically ordered.
            - If price to charge is Pc, price to discharge is Pd, then
            theoretical max. financial gain is Pd - Pc.
            - Due to efficiency, when buffering 1 kW, we consumed
            not 1 kW, but 1 kW / Efficiency. Therefore, we
            lost the following energy: (1 kW / Efficiency) - 1 kW.
            This cost: (1 / Eff - 1) * Pc.
            - This means, it only makes sense to charge when
            Pd - Pc > (1 / Eff - 1) * Pc or:
            Pd > Pc / Eff.
    """
    ScheduleCharge = StartCharge
    CandidateTime = CostData[0] [0]
    CandidateCost = CostData[0] [1]
    ChargeTimes = [ ]
    DischargeTimes = [ ]
    for (Time, Cost) in CostData:
        if ScheduleCharge:
            if Cost < CandidateCost:
                CandidateCost = Cost
                CandidateTime = Time
            else:
                if Cost > CandidateCost / Efficiency:
                    # We can discharge at a rate higher than our candidate
                    charging cost
                    # this means that our candidate for charging is a
                    good one.
                    Now find
                    # most suitable time to discharge!
                    ChargeTimes.append(CandidateTime)
                    ScheduleCharge = False
                    CandidateCost = Cost
                    CandidateTime = Time
                    continue
        else:
            if Cost > CandidateCost:
                CandidateCost = Cost
                CandidateTime = Time
            else:
                if Cost < CandidateCost * Efficiency:
                    # We can charge at a rate lower than our candidate
                    discharging cost
                    # this means that our candidate fordis charging is
                    a good one.
                    Now find
                    # most suitable time to charge!
                    DischargeTimes.append(CandidateTime)
                    ScheduleCharge = True
                    CandidateCost = Cost
                    CandidateTime = Time
                    continue
    return (ChargeTimes, DischargeTimes)
if __name__ == "__main__":
    (ChargeTimes, DischargeTimes) = findpeaks(all_prices)
    for (Time, Cost) in all_prices:
        ChargeDischarge = 0
        if Time in ChargeTimes:
            ChargeDischarge = 1
        if Time in DischargeTimes:
            ChargeDischarge = -1
        print time.strftime("%d/%m/%Y %H:%M:%S",
```

APPENDIX-continued

Pseudo-code Software Implementation time.localtime(Time)) + ", " + repr(Cost) + ", " + repr(ChargeDischarge)

The invention claimed is:

1. A method of controlling storage of electrical energy, the method comprising:
    detecting one of a candidate charging occasion and a candidate discharging occasion with respect to pricing data and energy losses, the pricing data indicative of future prices of electrical energy over time and the energy losses caused by charging and discharging an energy storage device and the electrical energy being supplied from an external electrical supply network, by selecting a next occurrence of a locally minimum price in the pricing data as the candidate charging occasion or a next occurrence of a locally maximum price in the pricing data as the candidate discharging occasion;
    validating, by circuitry of an energy management system, the one of the candidate charging occasion and the candidate discharging occasion when a price difference between the one of the candidate charging occasion and the candidate discharging occasion and another later price in the pricing data compensates for the energy losses;
    charging, by the circuitry when the candidate charging occasion is validated, the energy storage device with the electrical energy at the candidate charging occasion; and
    discharging, by the circuitry when the candidate discharging occasion is validated, the energy storage device at the candidate discharging occasion, wherein
    the validating further includes confirming whether $P_D > P_C/\text{Eff}$, where Eff is an efficiency of the charging and the discharging of the energy storage device and Eff is equal to a ratio of energy retrieved during the discharging to energy input during the charging, and one of
    $P_D$ is a price at the candidate discharge occasion and $P_C$ is a price paid at a most recent charging of the energy storage device, or
    $P_C$ is a price at the candidate charging occasion and $P_D$ is a price received at a most recent discharging of the energy storage device.

2. The method according to claim 1, wherein the validating the one of the candidate charging occasion and the candidate discharging occasion comprises detecting whether the pricing data relating to the candidate charging occasion and the candidate discharging occasion represents the respective lowest or highest price before the later price which validates that candidate occasion, and if not, replacing the candidate charging or discharging occasion by the respective lowest or highest price before the later price which validates that candidate occasion.

3. The method according to claim 1, wherein the pricing data used by the detecting and validating represents a time average of the pricing data over a predetermined time period.

4. The method according to claim 1, wherein the validating integrates the cost of electricity consumption against time over a charging cycle to detect the price associated with a charging occasion.

5. The method according to claim 1, wherein the validating applies a time-varying energy loss relating to a charged energy storage device in dependence upon an elapsed time since the last charging occasion.

6. The method according to claim 1, further comprising determining whether a first of the occasions should he a charging occasion or a discharging occasion in dependence upon a present charging state of the energy storage device.

7. The method according to claim 6, wherein the determining comprises comparing a measure of the present charging state with a threshold amount.

8. The method according to claim 7, further comprising varying the threshold in dependence upon the pricing data.

9. An energy storage controller for controlling storage of electrical energy, the energy storage controller comprising:
    circuitry configured to
        detect one of a candidate charging occasion and a candidate discharging occasion with respect to pricing data and energy losses, the pricing data indicative of future prices of electrical energy over time and the energy losses caused by charging and discharging an energy storage device and the electrical energy being supplied from an external electrical supply network, by selecting a next occurrence of a locally minimum price in the pricing data as the candidate charging occasion or a next occurrence of a locally maximum price in the pricing data as the candidate discharging occasion;
        validate the one of the candidate charging occasion and the candidate discharging occasion when a price difference between the one of the candidate charging occasion and the candidate discharging occasion and another later price in the pricing data compensates for the energy losses;
        charge, when the candidate charging occasion is validated the energy storage device with the electrical energy at the validated candidate charging occasion; and
        discharge, when the candidate discharging occasion is validated, the energy storage device at the candidate discharging occasion, wherein
    to validate the one of the candidate charging occasion and the candidate discharging occasion, the circuitry is further configured to confirm whether $P_D > P_C/\text{Eff}$, where Eff is an efficiency of the charging and the discharging of the energy storage device and Eff is equal to a ratio of energy retrieved during the discharging to energy input during the charging, and one of
    $P_D$ is a price at the candidate discharge occasion and $P_C$ is a price paid at a most recent charging of the energy storage device, or
    $P_C$ is a price at the candidate charging occasion and $P_D$ is a price received at a most recent discharging of the energy storage device.

10. An energy storage apparatus, comprising:
    the energy storage controller according to claim 9;
    the energy storage device comprising one or more batteries; and
    an inverter for producing an output voltage higher than the battery voltage.

11. An energy storage apparatus, comprising:
    the energy storage controller according to claim 9; and
    the energy storage device comprising:
        one or more batteries;

a movable mass having a motor for driving the movable mass; and a generator for generating electrical power from motion of the movable mass.

12. A non-transitory computer readable medium storing computer-executable instructions which, when executed by circuitry of a computer, cause the computer to perform a method comprising:

detecting one of a candidate charging occasion and a candidate discharging occasion with respect to pricing data and energy losses, the pricing data indicative of future prices of electrical energy over time and the energy losses caused by charging and discharging an energy storage device and electrical energy being supplied from an external electrical supply network, by selecting a next occurrence of a locally minimum price in the pricing data as the candidate charging occasion or a next occurrence of a locally maximum price in the pricing data as the candidate discharging occasion;

validating the one of the candidate charging occasion and the candidate discharging occasion when a price difference between the one of the candidate charging occasion and the candidate discharging occasion and another later price in the pricing data compensates for the energy losses;

charging, when the candidate charging occasion is validated, the energy storage device with the electrical energy at the candidate charging occasion; and discharging, when the candidate discharging occasion is validated, the energy storage device at the candidate discharging occasion, wherein the validating further includes confirming whether $P_D > P_C/\text{Eff}$, where Eff is an efficiency of the charging and the discharging of the energy storage device and Eff is equal to a ratio of energy retrieved during the discharging to energy input during the charging, and one of $P_D$ is a price at the candidate discharge occasion and $P_C$ is a price paid at a most recent charging of the storage device, or $P_C$ is a price at the candidate charging occasion and $P_D$ is a price received at a most recent discharging of the energy storage device.

13. The energy storage controller according to claim 9, wherein the circuitry is configured to validate the one of the candidate charging occasion and the candidate discharging occasion by detecting whether the pricing data relating to the candidate charging occasion and the candidate discharging occasion represents the respective lowest or highest price before the later price which validates that candidate occasion, and if not, replacing the candidate charging or discharging occasion by the respective lowest or highest price before the later price validates that candidate occasion.

14. The energy storage controller according to claim 9, wherein the pricing data used represents a time average of the pricing data over a predetermined time period.

15. The energy storage controller according to claim 9, wherein the circuitry validates by integrating the cost of electricity consumption against time over a charging cycle to detect the price associated with a charging occasion.

16. The energy storage controller according to claim 9, wherein the circuitry validates by applying a time-varying energy loss relating to charged energy storage device in dependence upon an elapsed time since the last charging occasion.

17. The method according to claim 1, wherein the energy losses include lost energy released as heat during the charging or the discharging of the energy storage device.

18. The energy storage controller according to claim 9, wherein the energy losses include lost energy released as heat during the charging or the discharging of the energy storage device.

* * * * *